(No Model.)
R. W. PERRY.
BIT HOLDER.
No. 354,485.  Patented Dec. 14, 1886.
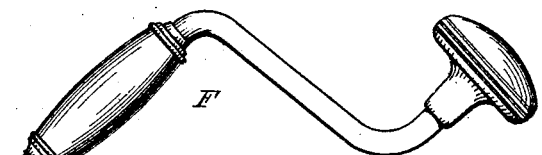
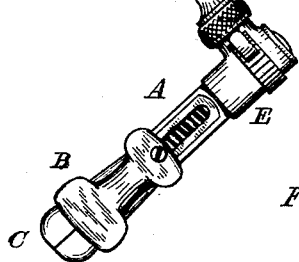
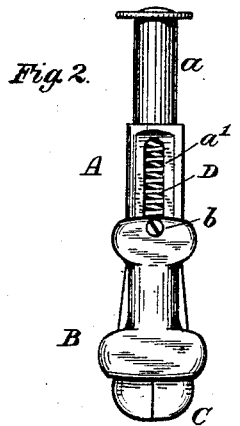
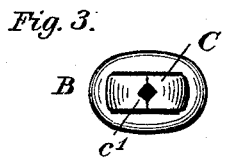
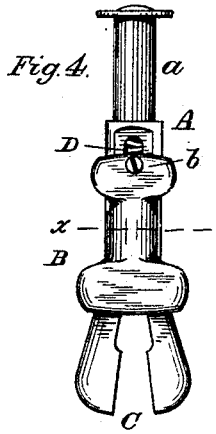
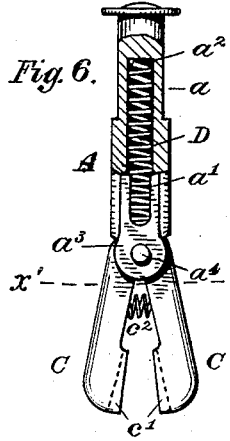
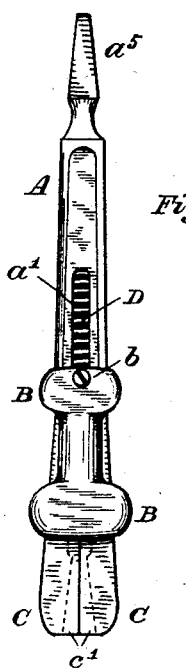
WITNESSES:
Wm B. Fowle
Robert N. Knight
INVENTOR
Reuben Wheelock Perry
BY
Rice & King
ATTORNEYS.

UNITED STATES PATENT OFFICE.

REUBEN WHEELOCK PERRY, OF GRAFTON, ASSIGNOR OF ONE-HALF TO JAMES W. STOCKWELL, OF SUTTON, MASSACHUSETTS.

BIT-HOLDER.

SPECIFICATION forming part of Letters Patent No. 354,485, dated December 14, 1886.

Application filed January 11, 1886. Serial No. 188,173. (No model.)

*To all whom it may concern:*

Be it known that I, REUBEN WHEELOCK PERRY, a citizen of the United States, residing in Grafton, in the county of Worcester and Commonwealth of Massachusetts, have invented a new and useful Automatic Bit-Holder, of which the following is a specification.

The nature of my invention consists in a special combination of mechanical devices in bit-holders, as will be hereinafter fully described.

To enable those skilled in the art to which my invention belongs to make and use the same I will proceed to describe it more in detail, reference being had to the drawings, in which—

Figure 1 is a view of the improved bit-holder as applied to an ordinary bit-brace. Figs. 2 to 7, both inclusive, are detailed views, on an enlarged scale, of the bit-holder proper detached from the brace. Fig. 8 is an extension bit-holder operating in the same manner as the bit-holder proper.

Similar letters refer to similar parts throughout the various views.

The flattened shank A, with cylindrical end $a$, the sleeve B, and the jaws C C, secured to the flattened shank A by the removable pin $a^4$, constitute the frame of the holder.

The shank A is made with the upper end, $a$, cylindrical in form, as shown in Fig. 2. The other portion of the shank is flattened on two of its sides, with the top and bottom oval. (See Fig. 2.) It has a hole extending from the lower end on the line X' Y' lengthwise nearly to its upper end for the reception of the spiral spring D. (See Fig. 6.) In the flattened sides of the shank are slots $a'$ for the movement of the screw-pin $b$, (a cross-section on the line X Y showing the hole $a^2$ in the shank for the reception of the spiral spring D, and also slots $a'$ in the flattened sides of the shank are exhibited in Fig. 5.) The flattened sides of shank A at $a^3$ are made rounding into ears, and the oval sides at this end are slotted, so that the bit-holding jaws may be inserted, as seen in Fig. 6. The bit-holding jaws C C, being inserted between the ears $a^3$ of the flattened sides of the shank A, are attached thereto by the removable pin $a^4$, (see Fig. 6,) and are movable thereon.

The two movable bit-holding jaws C C are made with the upper ends thinned down into ears, so as to be inserted between and to act in conjunction with ears $a^3$ of the flattened sides of the shank A. In the lower part of the bit-holding jaws, on the inside, are made squared indentations $c'$, for holding the squared head of a bit in the usual manner. An end view of the two jaws held together by the sliding sleeve, showing the indentation, is seen in Fig. 3. On the inside of each of the jaws C C, toward the upper end, is a little hole or socket, and in these sockets is set a spiral spring, $c^2$, to push apart the jaws C C, so as to receive the head of the bit. (See Fig. 6.)

The sliding sleeve B is a hollow band or collar, with a portion of the two sides which pass over the oval sides of the shank A made open for the purposes of lightness, sliding along the shank A and the jaws C C so far as the screw-pin $b$, operating in the slots $a'$, will permit. The two ends of the sleeve I prefer to make rounding, as shown in the drawings, although it is unnecessary that they should be so made. The sliding sleeve B has the screw-pin $b$ passing through its upper end, through the slots $a'$ at the end of the spiral spring D.

When there is no bit in the bit-holding jaws, they are held closely together by the pressure of the sliding sleeve B, thrust outward by the resistance of the spiral spring D against the screw-pin $b$, as is seen in Figs. 1 and 2, an end view of which is exhibited in Fig. 3.

When it is desired to insert a bit, the sliding sleeve B is pulled back by the hand of the operator, the screw-pin $b$, sliding in the slots $a'$, compressing the spiral spring D. The jaws C C are released from the pressure of the sliding sleeve B, and are pushed apart by the spiral spring $c^2$. Fig. 4 exhibits the action of the jaws with the sliding sleeve B pulled back, and Fig. 6 shows the action of the spiral spring $c^2$ when the pressure of sliding sleeve B is removed. The squared head of the bit is then inserted between the indentations $c'$ in the jaws C C in the usual manner. The sliding sleeve B is then released from the hand of the operator, and the spiral spring D in the hole $a^2$, pressing on the screw-pin $b$, sliding in the slots $a'$, forces the sliding sleeve B along the shank A and the movable jaws C C until the latter are clasped tightly by the sliding sleeve B, thereby holding the bit firmly in its place.

To remove the spiral spring D in the hole $a^2$ in case it is desired to do so, the screw-pin $b$ is removed and the sliding sleeve B is pushed back along the shank A farther than it can be when the screw-pin $b$ is in position, on account of the slots $a'$. This exposes the removable pin $a^4$ in the ears $a^3$, upon the removal of which the jaws C C may be taken away and an opportunity thereby afforded to take out, return, or exchange the spiral spring D, a cross-section on the line X' Y' showing the ears $a^3$ and the position of the hole for the spring D in the shank A, where the spring may be inserted in the shank when the holding-jaws C are removed, is exhibited in Fig. 7.

An extension bit-holder operating on the same principles may be made in the same manner, only in larger proportions, and having the upper end made with a square head, like the head of a bit, in the usual manner, or with any other end suitable for insertion into the bit-holder attached to the brace. (See Fig. 8.)

Those skilled in the art to which my invention belongs will notice that the shank A, being made flat on two sides, and the sliding sleeve B made with a corresponding opening or hole to fit said shank, gives great strength to the parts when the device is used, the strain being sustained by the flattened sides of the shank A and sleeve B, the screw-pin $b$ being entirely relieved from the twisting strain in such case, which would not be the case if the shank were round, since in this latter case pin $b$ would have to sustain all the strain and would soon give way and become useless.

By forming the flattened shank A with a central hole for the spring which operates the sleeve B the spring can be made small in diameter, and is well protected from injury, while its action is always free and easy—screw-pin $b$ always pressing centrally across its end—and the parts are compact and not liable to get out of order. The lower outer ends of jaws C C are made with double inclines, the upper inclines running in and back and the lower inclines running down and in. Sliding sleeve B upon its unflattened sides is flaring to correspond with the form of the upper inclines of the jaws C C, and as a result, when sleeve B moves down its flaring sides fit the flaring sides of the jaws, and the latter are forced together by a wedging action of the parts, which is more effectual in holding the jaws to their work than would be the case if the outer edges of sleeve B only came in contact with the edges of the jaws. This arrangement, too, allows the jaws to open quickly and widely for the admission of the bit-shank by a comparatively slight motion of the sliding sleeve B, while they close with equal rapidity and retain their hold upon the bit-shank in a firm manner.

Although I have described my improvement as a bit-holder, it may be used advantageously as a wrench, the nut to be turned being secured in the jaws C C in the same manner as herein described for securing an ordinary bit.

What I claim as my invention, and desire to secure by Letters Patent, is—

The combination, in a bit-holder, with the peculiarly-constructed shank A, the upper end of which is fitted to connect with the bit-brace, while the other or lower end is made with flattened sides and long slots $a'$, terminating with rounded-ended ears $a^3$, between which a central hole, $a^2$, extends longitudinally up to the top of the flattened sides, all as shown and described, of the double-inclined flattened-sided jaws C C, their upper ends being lapped and hinged between the ears $a^3$ by pivot $a^4$, spiral spring D, arranged in central hole, $a^2$, sleeve B, provided with flattened sides and flaring end to fit the flattened sides of shank A, and flattened sides and upper wedged-shaped or inclined edges of jaws C C, spring $c^2$, and pin $b$, said parts being constructed and relatively arranged for operation substantially as and for the purposes described.

REUBEN WHEELOCK PERRY.

Witnesses:
HENRY WILSON KING,
LUTHER EMERSON BARNES.